United States Patent
Chowdhury et al.

(10) Patent No.: US 12,511,600 B2
(45) Date of Patent: Dec. 30, 2025

(54) SYSTEMS AND METHODS FOR SIMULATION FORECASTING INCLUDING DYNAMIC REALIGNMENT

(71) Applicant: Walmart Apollo, LLC, Bentonville, AR (US)

(72) Inventors: Samrat Chowdhury, Karnataka (IN); Gayathri Sanjeev Somarajan, Kollam (IN); Anupa Saxena, Bangalore (IN); Ying Cao, Houston, TX (US); Rajat Kumar Gupta, Bentonville, AR (US); Debdut Hazra Banerjee, Karnataka (IN); Jingying Zhang, Beaumont, TX (US); Lokesh Kumar Sambasivan, Andhra Pradesh (IN)

(73) Assignee: Walmart Apollo, LLC, Bentonville, AR (US)

( * ) Notice: Subject to any disclaimer, the term of this patent is extended or adjusted under 35 U.S.C. 154(b) by 166 days.

(21) Appl. No.: 18/474,925

(22) Filed: Sep. 26, 2023

(65) Prior Publication Data

US 2025/0103984 A1    Mar. 27, 2025

(51) Int. Cl.
*G06Q 10/0631* (2023.01)
*G06Q 10/0637* (2023.01)
*G06Q 30/0202* (2023.01)

(52) U.S. Cl.
CPC . *G06Q 10/06315* (2013.01); *G06Q 10/06375* (2013.01); *G06Q 30/0202* (2013.01)

(58) Field of Classification Search
CPC ....... G06Q 10/06315; G06Q 10/06375; G06Q 30/0202

See application file for complete search history.

(56) References Cited

U.S. PATENT DOCUMENTS 7,747,543 B1   6/2010  Braumoeller et al.
11,170,391 B2 * 11/2021 Morgan ........... G06Q 10/06315
(Continued)

FOREIGN PATENT DOCUMENTS

CN          1815498 A  *  8/2006  ............. G06Q 10/04

OTHER PUBLICATIONS

Halbwirth "Time-Series Forecasting of an Electric Steel Mill's Power Demand—A Neural Network Approach", Chair of Energy Network Technology, Montanuniversitat Leoben. May 2022. (Year: 2022).*

(Continued)

*Primary Examiner* — Pan G Choy
(74) *Attorney, Agent, or Firm* — Morgan, Lewis & Bockius LLP; Manita Rawat

(57) ABSTRACT

Systems and methods for simulation forecasting in target networks including dynamic realignment are disclosed. A set of target nodes including at least one demand node realignment representative of a demand volume shift for at least one corresponding distribution node in a predetermined time period is received. When the demand volume shift is equal to or above a predetermined threshold, an estimated volume feature for the at least one corresponding distribution node is generated. When the demand volume shift is below the predetermined threshold, an actual volume feature for the at least one corresponding distribution node is generated. The generated one of the estimated volume feature or the actual volume feature is provided to a trained forecasting model to generate a demand forecast data structure based on the generated one of the estimated volume feature or the actual volume feature.

20 Claims, 11 Drawing Sheets

(56) References Cited

U.S. PATENT DOCUMENTS

| | | | |
|---|---|---|---|
| 11,948,111 B1* | 4/2024 | Deng | G06Q 10/06315 |
| 2003/0144897 A1* | 7/2003 | Burruss | G06Q 30/0202 |
| | | | 705/7.31 |
| 2008/0249839 A1* | 10/2008 | Lee | G06Q 10/0637 |
| | | | 705/7.14 |
| 2009/0327033 A1* | 12/2009 | Rai | G06Q 10/087 |
| | | | 705/28 |
| 2010/0094675 A1* | 4/2010 | Li | G06Q 30/02 |
| | | | 709/217 |
| 2010/0138264 A1 | 6/2010 | Faris et al. | |
| 2011/0066449 A1* | 3/2011 | Backhaus | G06Q 10/06 |
| | | | 705/2 |
| 2014/0122180 A1 | 5/2014 | Chan | |
| 2015/0371244 A1* | 12/2015 | Neuse | G06Q 30/0202 |
| | | | 705/7.31 |
| 2019/0130425 A1* | 5/2019 | Lei | G06Q 10/0631 |
| 2019/0139059 A1* | 5/2019 | Shiga | G06Q 30/0202 |
| 2020/0334618 A1 | 10/2020 | Hodges et al. | |
| 2022/0027744 A1* | 1/2022 | Krishnan | G06Q 10/06315 |
| 2023/0153936 A1 | 5/2023 | Putcha et al. | |

OTHER PUBLICATIONS

Pradeepkumar et al., "Forecasting financial time series volatility using Particle Swarm Optimization trained Quantile Regression Neural Network", Center of Excellence in Analytics, Institute for Development and Research in Banking Technology. Applied Soft Computing 58 (2017) 35-52. (Year: 2017).*

* cited by examiner

SYSTEMS AND METHODS FOR SIMULATION FORECASTING INCLUDING DYNAMIC REALIGNMENT

TECHNICAL FIELD

This application relates generally to simulation of large scale distribution networks, and more particularly, to forecasting simulations including dynamic realignment.

BACKGROUND

Simulation forecasting for large scale distribution networks currently includes time series forecasting to simulate predicted demand within the large scale distribution network. Current systems rely on historical data to estimate future volume (e.g., demand). However, large scale distribution networks can include instances of volume increase or decrease that are not reflected in historical patterns (e.g., not adequately captured by historical data). For example, volume changes from dynamic realignment of nodes and/or edges within the large scale distribution network are typically not predictable using historical trend data.

Some existing simulation forecasting systems apply proportion adjustment to address realignments that occur within a forecast period. Proportion adjustments include reallocation of pre-alignment volume predictions from a first node to a second node. Although proportion adjustment provides reassignment of volume within the simulated forecast, the proportional adjustments do not consider difference across volumes at different nodes and fail to provide accurate predictions. Current simulation forecasting systems are also unable to address scenarios including multiple realignments within the same forecast period and require computationally expensive retraining of forecasting models.

SUMMARY

In various embodiments, a system including a non-transitory memory and a processor communicatively coupled to the non-transitory memory is disclosed. The processor is configured to read a set of instructions to receive a set of target nodes including at least one demand node realignment representative of a demand volume shift for at least one corresponding distribution node in a predetermined time period and determine when the demand volume shift is equal to or above a predetermined volume shift threshold. When the demand volume shift is equal to or above the predetermined threshold, the processor is configured to generate an estimated volume feature for the at least one corresponding distribution node. When the demand volume shift is below the predetermined threshold, the processor is configured to generate an actual volume feature for the at least one corresponding distribution node. The processor is further configured to provide the generated one of the estimated volume feature or the actual volume feature to a trained forecasting model and generate a demand forecast data structure based on the generated one of the estimated volume feature or the actual volume feature.

In various embodiments, a computer-implemented method is disclosed. The computer-implemented method includes steps of receiving a set of target nodes including at least one demand node realignment representative of a demand volume shift for at least one corresponding distribution node in a predetermined time period and determining when the demand volume shift is equal to or above a predetermined volume shift threshold. When the demand volume shift is equal to or above the predetermined threshold, the computer-implemented method includes a step of generating an estimated volume feature for the at least one corresponding distribution node. When the demand volume shift is below the predetermined threshold, the computer-implemented method includes a step of generating an actual volume feature for the at least one corresponding distribution node. The computer-implemented method further includes steps of providing the generated one of the estimated volume feature or the actual volume feature to a trained forecasting model and generating a demand forecast data structure based on the generated one of the estimated volume feature or the actual volume feature.

In various embodiments, a non-transitory computer-readable medium having instructions stored thereon is disclosed. The instructions, when executed by at least one processor, cause at least one device to perform operations including receiving a set of target nodes comprising at least one demand node realignment representative of a demand volume shift for at least one corresponding distribution node in a predetermined time period and determining when the demand volume shift is equal to or above a predetermined volume shift threshold. When the demand volume shift is equal to or above the predetermined threshold, the device is further configured to perform operations including generating an estimated volume feature for the at least one corresponding distribution node. The estimated volume feature is generated based on historic demand volume for each demand node in the set of target demand nodes assigned to the at least one distribution node in a forecast period. When the demand volume shift is below the predetermined threshold, the device is further configured to perform operations including generating an actual volume feature for the at least one corresponding distribution node. The actual volume feature is generated based on historic volume for the at least one corresponding distribution node. The device is further configured to perform operations including providing the generated one of the estimated volume feature or the actual volume feature to a trained forecasting model and generating a demand forecast data structure based on the generated one of the estimated volume feature or the actual volume feature.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
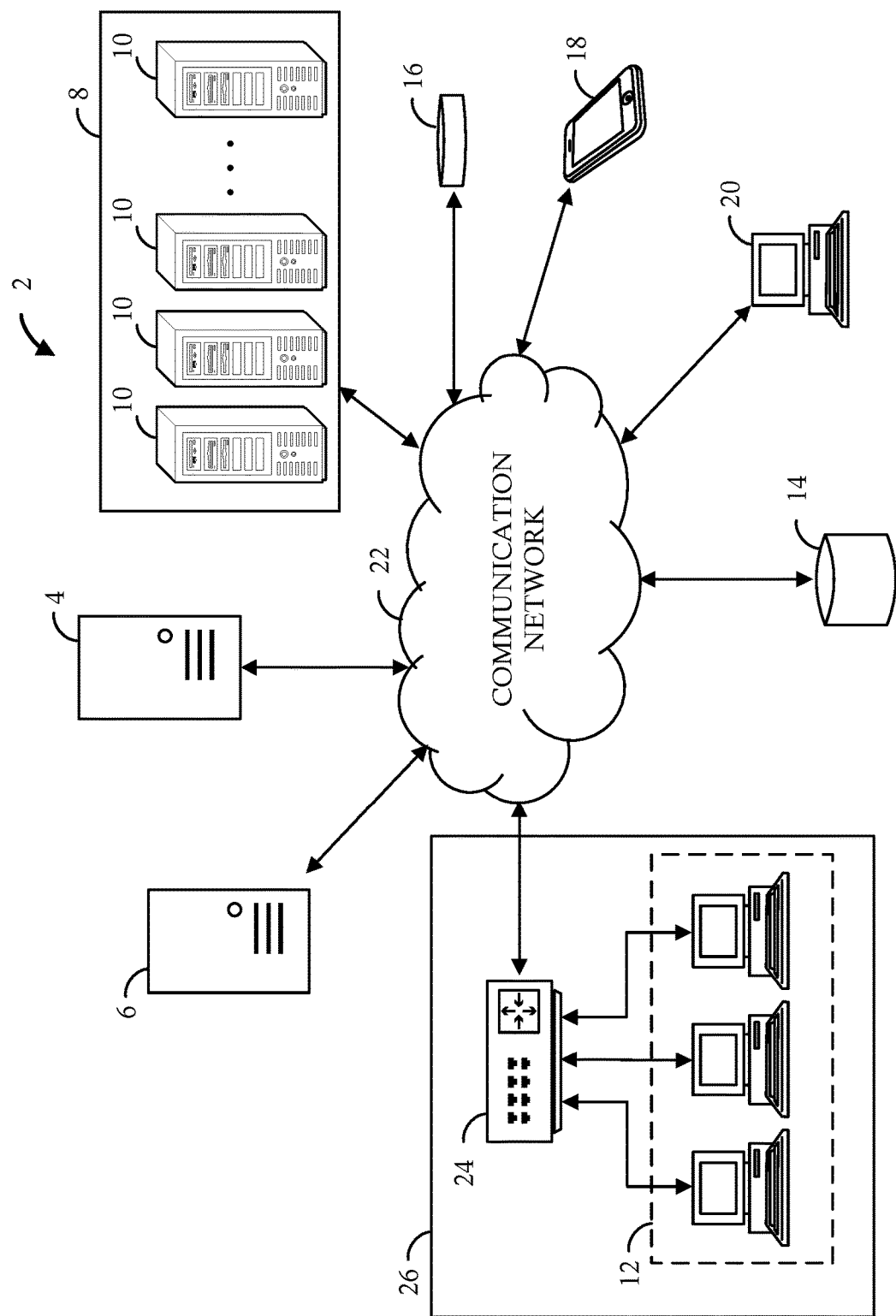
FIG. 1 illustrates a network environment configured to provide simulation forecasting including dynamic realignment scenarios, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for simulation forecasting of large scale distribution networks in dynamic modal shift scenarios. In various embodiments, a feature-based simulation forecasting method is configured to generate a demand (e.g. volume) forecast data structure for one or more nodes (e.g., demand nodes, distribution nodes, etc.) within a large scale distribution network. The demand forecast data structure is generated by a forecasting model configured to receive one or more demand features to accurately capture unexpected and/or non-historic volume shifts within the large scale distribution network. For example, in some embodiments, the forecasting model utilizes the one or more demand features to accurately capture volume changes based on realignment of demand nodes and distribution nodes within the large scale distribution network during a forecast period.

In some embodiments, systems, and methods for simulation forecasting of large scale distribution networks in dynamic modal shift scenarios includes one or more trained forecasting models and/or realignment detection models. The trained forecasting may include one or more models configured to simulate a large scale distribution network (or a portion thereof) to generate a demand (e.g., volume) estimation for a selected time period. The trained forecasting model may be configured to receive historical demand data, demand features, and/or any other suitable input. A realignment detection model may be configured to detect realignment of one or more nodes within a large scale distribution network such that the volume of the realigned nodes may be adjusted. The realignment detection model may be configured to generate a dataset including each realigned node detected in a distribution network for a predetermined time period.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

In various embodiments, neural networks which are trained (e.g., configured or adapted) to generate forecasted demand and/or volume or sets of realigned nodes, are disclosed. A neural network trained to generate forecast demand may be referred to as a trained simulation forecasting model or a trained forecasting model. A trained simulation forecasting model may be configured to receive a set of input data, such as a set of historical (e.g., trend) demand data, a set of demand features for one or more identified nodes (e.g. realigned nodes) and/or any other suitable input and generate a forecasted (e.g., estimated) demand for one or more nodes in a large scale distribution network.

FIG. 1 illustrates a network environment 2 configured to provide simulation forecasting for large scale distribution networks including dynamic realignment scenarios, in accordance with some embodiments. The network environment 2 includes a plurality of devices or systems configured to communicate over one or more network channels, illustrated as a network cloud 22. For example, in various embodiments, the network environment 2 may include, but is not limited to, a simulation forecasting computing device 4, a web server 6, a cloud-based engine 8 including one or more processing devices 10, workstation(s) 12, a database 14, and/or one or more user computing devices 16, 18, 20 operatively coupled over the network 22. The simulation forecasting computing device 4, the web server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the simulation forecasting computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the simulation forecasting computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the simulation forecasting computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the simulation forecasting computing device 4, for example. The workstation(s) 12 may communicate with the simulation forecasting computing device 4 over the communication network 22. The workstation(s) 12 may send data to, and receive data from, the simulation forecasting computing device 4. For example, the workstation(s) 12 may transmit data related to tracked operations performed at the physical location 26 to simulation forecasting computing device 4.

Although FIG. 1 illustrates three user computing devices 16, 18, 20, the network environment 2 may include any number of user computing devices 16, 18, 20. Similarly, the network environment 2 may include any number of the simulation forecasting computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the simulation forecasting computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the first user computing device 16, the second user computing device 18, and the Nth user computing device 20 may communicate with the web server 6 over the communication network 22. For example, each of the user computing devices 16, 18, 20 may be operable to view, access, and interact with a website, such as a forecasting and/or simulation website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as initiating generation of a demand forecast data structure, implementation or execution of computer-implemented process incorporation and/or based on a demand forecast data structure, simulating implementation of a demand forecast data structure, and/or viewing data related to any of the available operations. The website may capture these activities as user session data, and transmit the user session data to the simulation forecasting computing device 4 over the communication network 22. The website may also allow the user to interact with one or more of interface elements to perform specific operations, such as selecting a distribution network and/or a portion of a distribution network for demand forecasting. In some embodiments, the web server 6 transmits user interaction data identifying interactions between the user and the website to the simulation forecasting computing device 4.

In some embodiments, the simulation forecasting computing device 4 may execute one or more models, processes, or algorithms, such as a machine learning model, deep learning model, statistical model, etc., to generate the demand forecast data structure. The simulation forecasting computing device 4 may transmit the demand forecast data structure to the web server 6 over the communication network 22, and the web server 6 may display interface elements associated with the demand forecast data structure and/or the large scale distribution network on the website to the user. For example, the web server 6 may display interface elements associated with a demand forecast data structure to the user on a network interface page.

In some embodiments, the web server 6 transmits a demand forecast request to the simulation forecasting computing device 4. The demand forecast request may be a include identification of a large scale network and/or one or more network parameters. In some embodiments, the demand forecast request includes a realignment of one or more a demand nodes with respect to a distribution node for at least one network resource. In some embodiments, the web server 6 transmits a simulation request to the simulation forecasting computing device 4 and/or a separate simulation computing device. The simulation forecasting computing device 4 may include a simulation process configured to simulate application of the demand forecast data structure to the distribution network.

The simulation forecasting computing device 4 is further operable to communicate with the database 14 over the communication network 22. For example, the simulation forecasting computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the simulation forecasting computing device 4, in some embodiments, the database 14 may be a local storage device, such as a hard drive, a non-volatile memory, or a USB stick. The simulation forecasting computing device 4 may store interaction data received from the web server 6 in the database 14. The simulation forecasting computing device 4 may also receive from the web server 6 user session data identifying events associated with browsing sessions, and may store the user session data in the database 14.

In some embodiments, the simulation forecasting computing device 4 generates training data for a plurality of models (e.g., machine learning models, deep learning models, statistical models, algorithms, etc.) based on aggregation data, variant-level data, holiday and event data, recall data, historical user session data, search data, purchase data, catalog data, advertisement data for the users, etc. The simulation forecasting computing device 4 and/or one or more of the processing devices 10 may train one or more models based on corresponding training data. The simulation forecasting computing device 4 may store the models in a database, such as in the database 14 (e.g., a cloud storage database).

The models, when executed by the simulation forecasting computing device 4, allow the simulation forecasting computing device 4 to generate a demand forecast data structure that incorporates (e.g., accounts for or simulates) non-historical and/or non-periodic volume shifts due to realignment of nodes within a large scale distribution network. For example, the simulation forecasting computing device 4 may obtain one or more models from the database 14. The simulation forecasting computing device 4 may then receive, in real-time from the web server 6, a demand forecast request that includes at least one node realignment within the forecast period. In response to receiving the demand forecast request, the simulation forecasting computing device 4 may execute one or more models to determine if the node realignment has a significant impact on volume demand (e.g., has a potential and/or expected demand shift equal to or above a predetermined threshold), generate demand features related to the volume shift due to realignment, and/or generate a demand forecast data structure based on historical demand and the demand features.

In some embodiments, the simulation forecasting computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, simulation forecasting computing device 4 may generate a demand forecast data structure embodying a demand forecast for a predetermined forecast time period.

Figure 2:
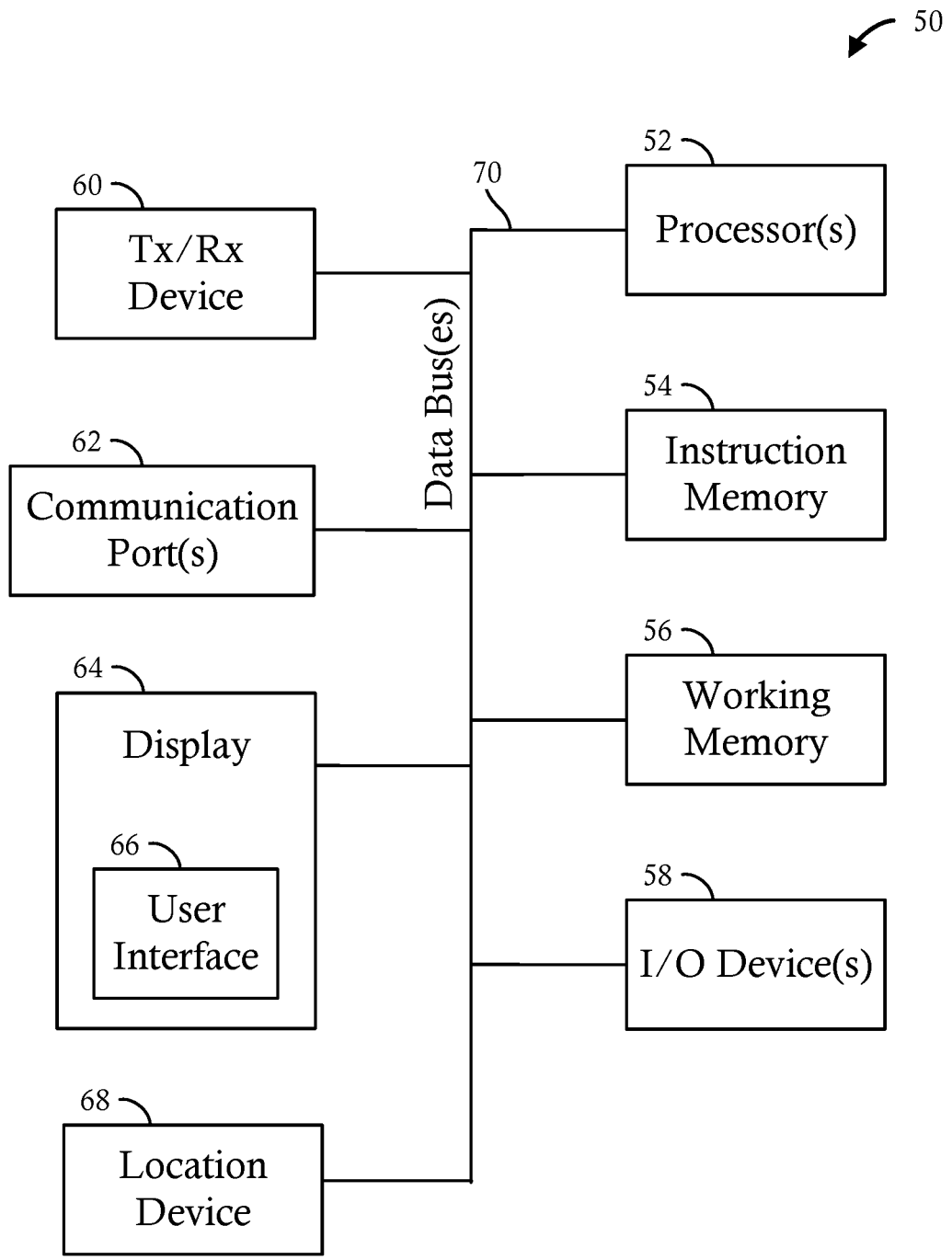
FIG. 2 illustrates a computer system configured to implement one or more processes, in accordance with some embodiments.

FIG. 2 illustrates a block diagram of a computing device 50, in accordance with some embodiments. In some embodiments, each of the simulation forecasting computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for simulation forecasting of large scale distribution networks including dynamic realignment scenarios, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with a demand forecast data structure and/or simulation results for simulation of a large scale distribution network utilizing the demand forecast embodied in the demand forecast data structure. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to the a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
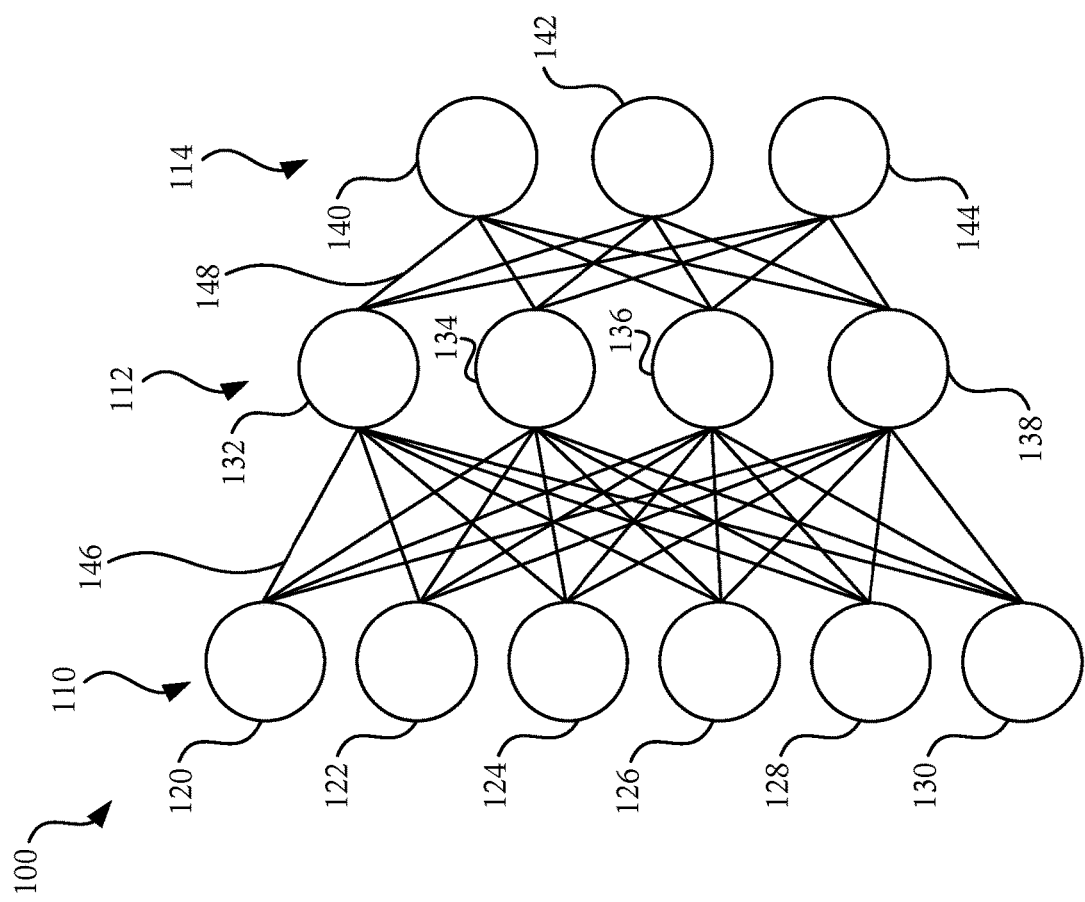
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval [−1, 1], within the interval [0, 1], and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ may be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta_j^{(n+1)}$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f is the first derivative of the activation function, and $\gamma_j^{(n+1)}$ is the comparison training value for the j-th node of the output layer 114.

Figure 4:
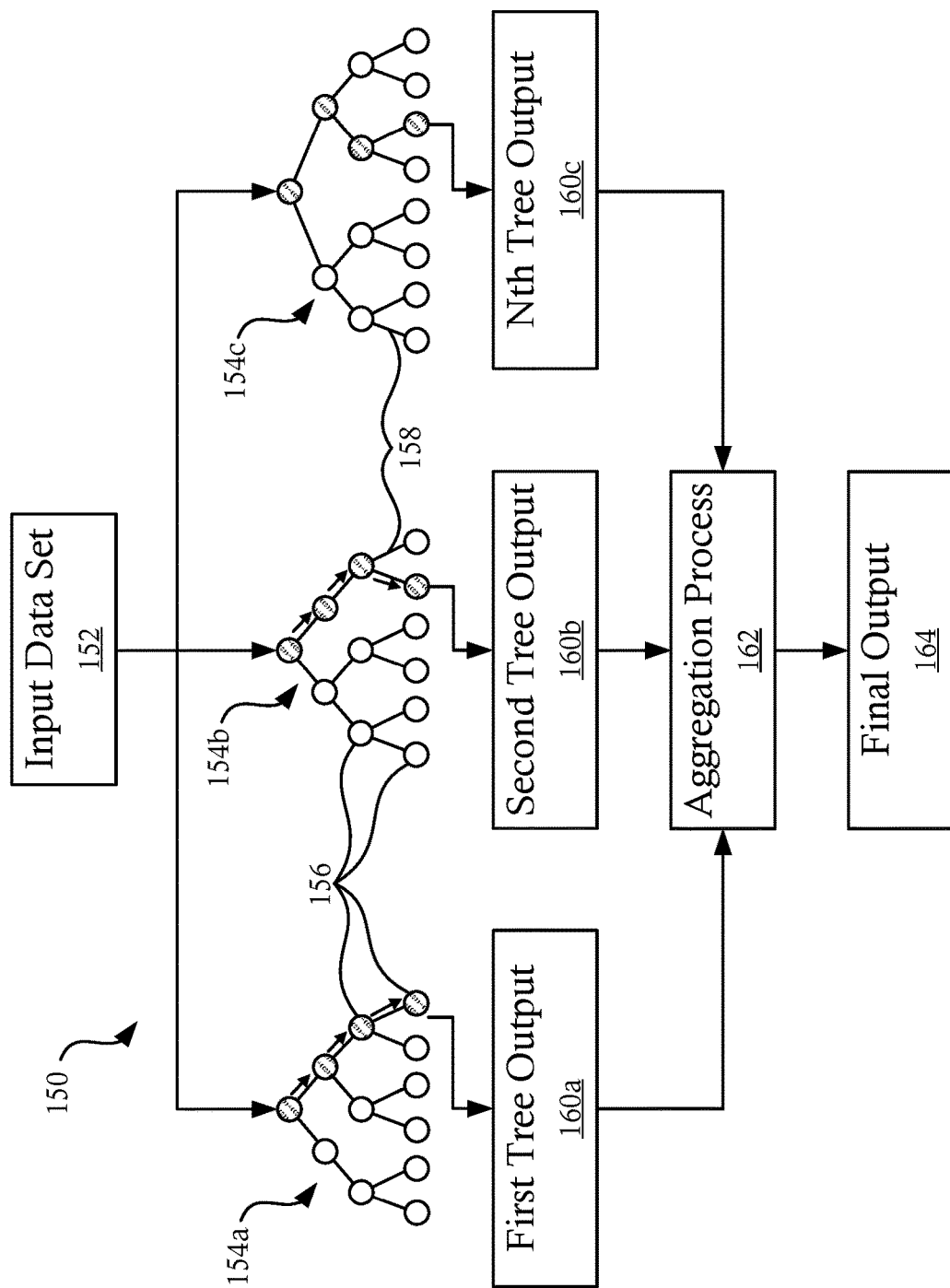
FIG. 4 illustrates a tree-based artificial neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154*a*-154*c* each including a set of nodes 156 (also referred to as "leaves") and a set of edges 158 (also referred to as "branches").

Each of the trained decision trees 154*a*-154*c* may include a classification and/or a regression tree (CART). Classification trees include a tree model in which a target variable may take a discrete and/or continuous set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154*a*-154*c*. The subset may include a portion of and/or all of the features or attributes included in the input data set 152. Each of the trained decision trees 154*a*-154*c* is trained to receive the subset of the input data set 152 and generate a tree output value 160*a*-160*c*, such as a classification or regression output. The individual tree output value 160*a*-160*c* is determined by traversing the trained decision trees 154*a*-154*c* to arrive at a final leaf (or node) 156.

In some embodiments, the tree-based neural network 150 applies an aggregation process 162 to combine the output of each of the trained decision trees 154*a*-154*c* into a final output 164. For example, in embodiments including classification trees, the tree-based neural network 150 may apply a majority-voting process to identify a classification selected by the majority of the trained decision trees 154*a*-154*c*. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 5:
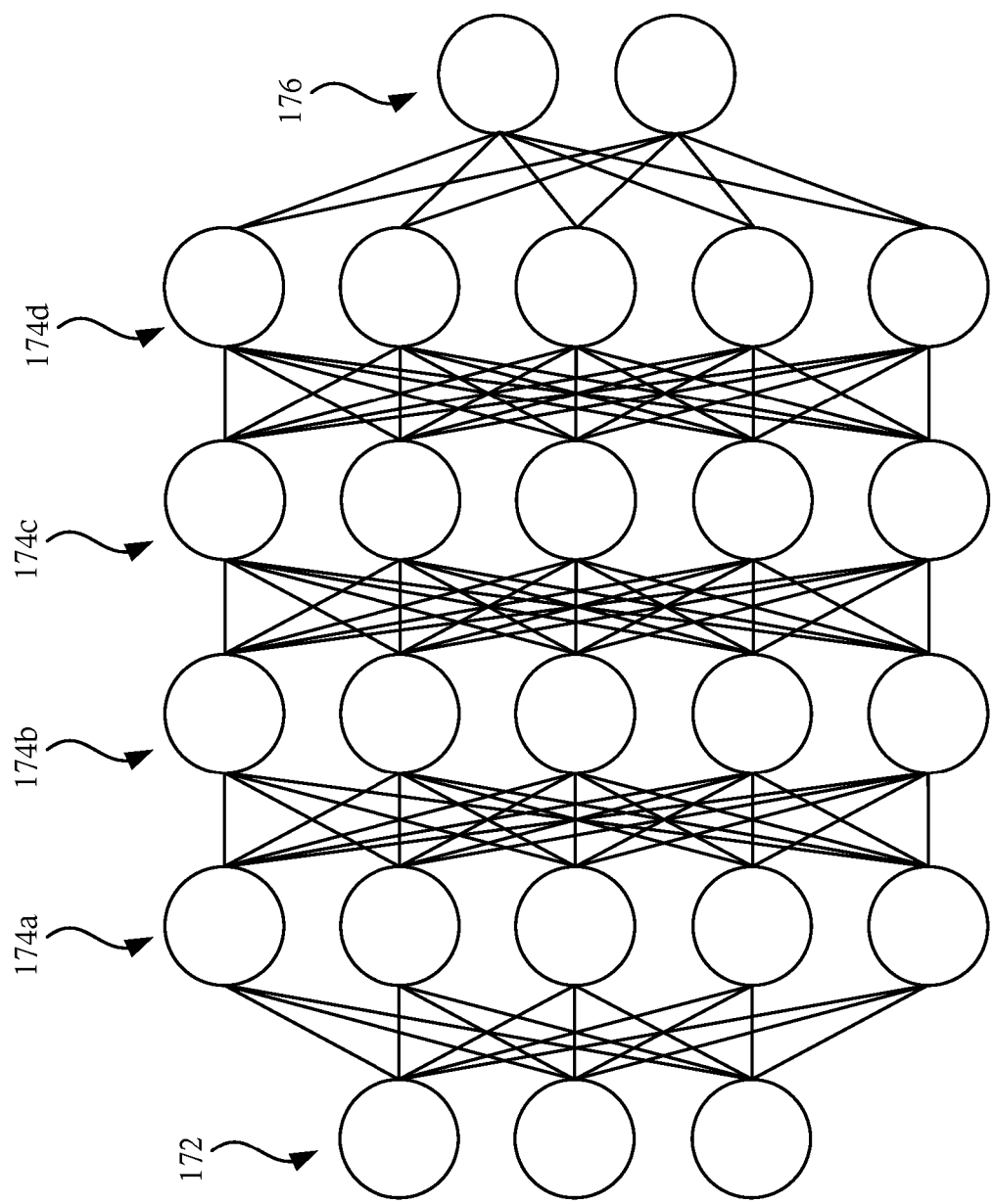
FIG. 5 illustrates a deep neural network (DNN), in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 may include an unbounded number of (e.g., two or more) intermediate layers 174*a*-174*d* each of a bounded size (e.g., having a predetermined number of nodes), providing for practical application and optimized implementation of a universal classifier. Each of the layers 174*a*-174*d* may be heterogenous. The DNN 170 may be configured to model complex, non-linear relationships. Intermediate layers, such as intermediate layer 174*c*, may provide compositions of features from lower layers, such as layers 174*a*, 174*b*, providing for modeling of complex data.

In some embodiments, the DNN 170 may be considered a stacked neural network including multiple layers each configured to execute one or more computations. The computation for a network with L hidden layers may be denoted as:

$$f(x) = f\left[a^{(L+1)}\left(h^{(L)}\left(a^{(L)}\left(...\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$ where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + ... + f_K(x_K)$$

where β is an offset and each $f_i$ is parametrized by a neural network. In some embodiments, the DNN 170 may include a neural multiplicative model (NMM), including a multiplicative form for the NAM mode using a log transformation of the dependent variable γ and the independent variable x:

$$\gamma = e^{\beta} e^{f(\log x)} e^{\Sigma_i f_i^d(d_i)}$$

where d represents one or more features of the independent variable x.

Figure 6:
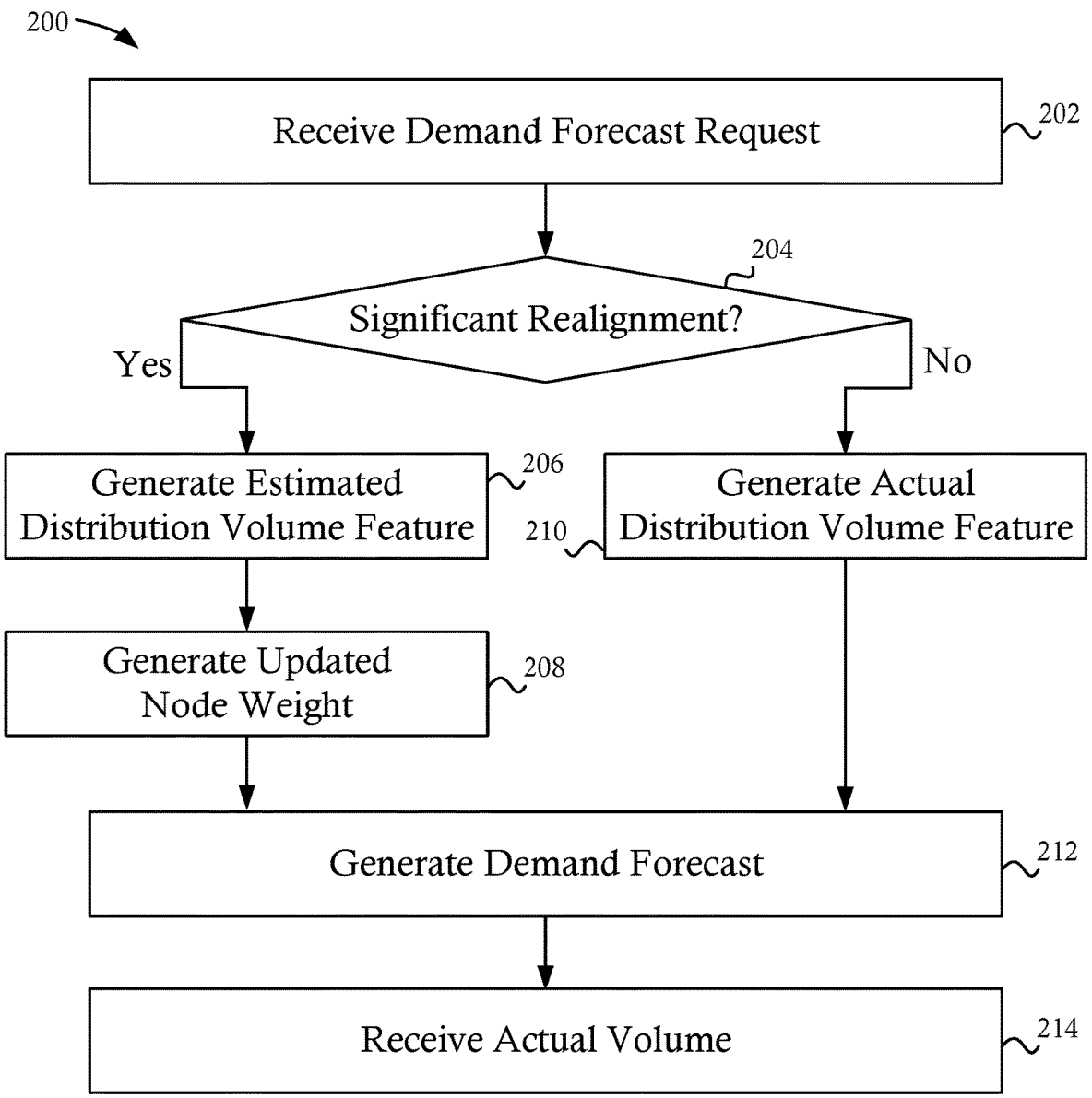
FIG. 6 is a flowchart illustrating a feature-based simulation forecasting method, in accordance with some embodiments.
Figure 7:
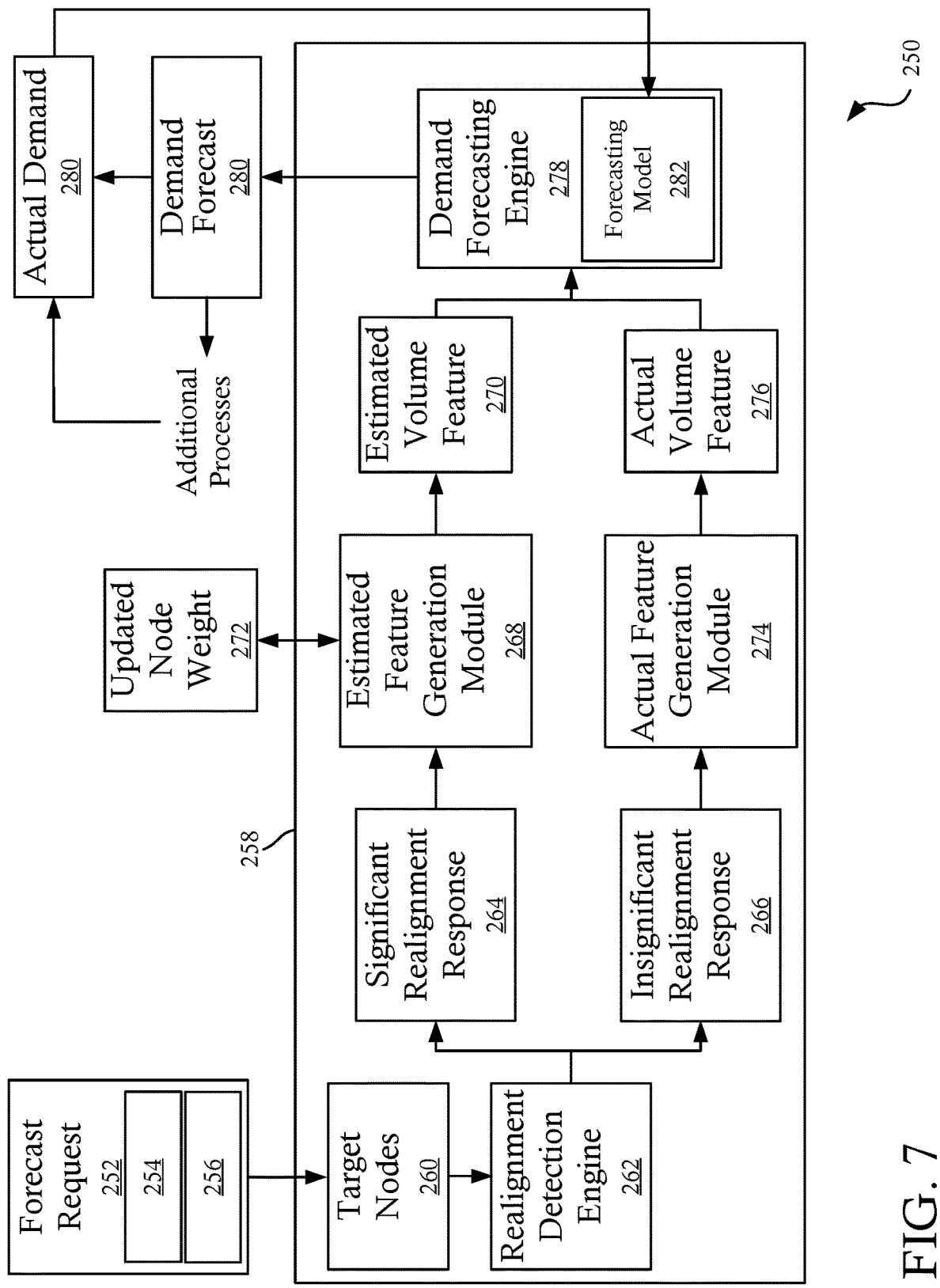
FIG. 7 is a process flow illustrating various steps of the feature-based simulation forecasting method of FIG. 6, in accordance with some embodiments.

FIG. 6 is a flowchart illustrating a feature-based simulation forecasting method 200, in accordance with some embodiments. FIG. 7 is a process flow 250 illustrating various steps of the feature-based simulation forecasting method 200, in accordance with some embodiments. The feature-based simulation forecasting method 200 may be implemented and/or executed periodically and/or dynamically to generate demand forecasts, e.g., demand forecast data structures, representative of demand (e.g., volume) requirements of one or more resources in a large scale distribution network. The feature-based simulation forecasting method 200 provides an improved demand forecasting process capable of estimating distribution node demand for a forecast period that includes realignment of one or more nodes in the large scale distribution network within a predetermined realignment period.

At step 202, a demand forecast request 252 is received. The demand forecast request 252 may be generated by any suitable system. For example, in some embodiments, the demand forecast request 252 may be generated by a web server 6, a workstation 12, and/or a user computing device 16, 18, 20 in response to one or more interactions with a forecasting and/or simulation interface. The demand forecast request 252 may be received by any suitable system, device, engine, module, etc., such as, for example, a demand forecast engine 258. The demand forecast request 252 may include a request to generate a demand forecast data structure representative of a demand forecast for a target distribution network, a portion of a target distribution network, and/or specific distribution nodes in a target distribution network.

The demand forecast request 252 may include network data 254 defining and/or identifying a target distribution network. For example, in some embodiments, the network data 254 includes an in-memory representation of a target network. As another example, in some embodiments, the network data 254 includes an identifier utilized by the demand forecast engine 258 to retrieve an in-memory representation of a target network from a data source, such as database 14. As yet another example, in some embodiments, the network data 254 includes one or more parameters and/or identifiers to configure the demand forecast engine 258 to generate an in-memory representation of a target network. Although specific embodiments are discussed herein, it will be appreciated that any suitable process and/or method may be used to obtain an in-memory representation of a target network as part of a feature-based simulation forecasting method 200.

Figure 8:
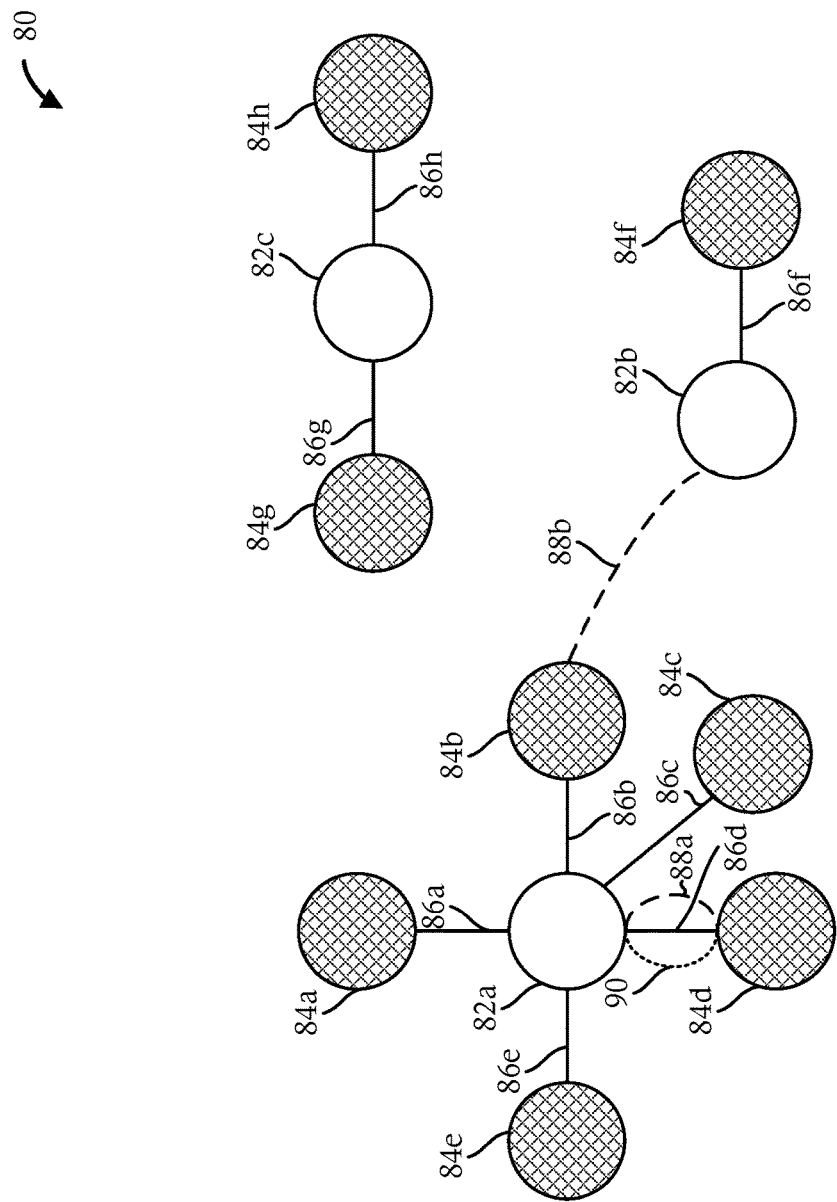
FIG. 8 illustrates a graph representation of an example target network, in accordance with some embodiments.

FIG. 8 illustrates a graph representation of an example target network 80, in accordance with some embodiments. The graph representation of the target network 80 includes a multipartite graph including a plurality of distribution nodes 82a-82c (collectively "distribution nodes 82"), a plurality of demand nodes 84a-84f (collectively "demand nodes 84"), a plurality of first distribution channels 86a-86h (collectively "first distribution channels 86"), a plurality of second distribution channels 88a-88b (collectively "second distribution channels 88"), and at least one third distribution channel 90 (collectively, with the first distribution channels 86 and the second distribution channels 88, "distribution channels 86, 88, 90"). Each of the distribution nodes 82 represent a distribution location or element within the target network 80 that provides one or more resources to service demand within the target network 80 and each of the demand nodes 84 represent a demand location or element within the target network 80 that consume one or more resources.

In some embodiments, each of the demand nodes 84 is connected to at least one of the distribution nodes 82 by at least one of the distribution channels 86, 88, 90. As illustrated in FIG. 8, a demand node and a distribution node may be connected by two or more distribution channels, allowing the distribution node to service demand of the demand node utilizing only one of the two or more distribution channels and/or utilizing multiple distribution channels simultaneously. For example, in the illustrated embodiment, the first distribution node 82a may satisfy demand of a second demand node 84b via a first distribution channel 86b and/or a second distribution channel 88a. Similarly, the first distribution node 82a may satisfy demand of a fourth demand node 84d via a first distribution channel 86b, a second distribution channel 88a, and/or a third distribution channel 90.

In some embodiments, a demand node may be connected to (e.g., serviced by) two or more distribution nodes. For example, as shown in the illustrated embodiment, the second demand node 82b may be serviced by the first distribution node 82a and/or by the second distribution node 82b. The demand of the second demand node 82b may be allocated to only one of the connected distribution nodes, e.g., only one of the first distribution node 82a or the second distribution node 82b, and/or may be partially allocated to the first distribution node 82a and partially allocated to the second distribution node 82b. In some embodiments, the first distribution node 82a may be configured to provide a first resource, e.g., satisfy a demand for a first resource, and the second distribution node 82b may be configured to provide a second resource, e.g., satisfy a demand for a second resource.

In some embodiments, the network data 254 may include one or more node features and/or parameters representative of a resource available at a corresponding one of the distribution nodes 82. For example, in some embodiments, each of the distribution nodes 82 can provide one or more limited resources that may be utilized (e.g., consumed) during fulfillment of demand at corresponding demand nodes 84. As one example, in some embodiments including a target supply chain network, each of the distribution nodes 82 may provide one or more resources corresponding to items supplied by the supply chain network, such as, for example, various categories of goods (e.g., perishables such as meat, produce, frozen goods, dairy, etc., non-perishables such as apparel, shoes, hazardous goods, etc., non-retail items such as shelves, tags, etc., and/or other categories of goods) and/or may include internally consumable resources for servicing demand (e.g., loading resources, labor resources, etc.). As another example, in some embodiments including a target computing network, each of the distribution nodes 82 may provide one or more compute resource, e.g., compute time or cycles, that may be consumed by a corresponding demand node 84 over a predetermined period. Although certain embodiments are discussed herein, it will be appreciated that the target network 80 may include any suitable target network including distribution nodes configured to provide any suitable associated resources.

In some embodiments, the network data 254 may include historical trend data representative of demand requirements for one or more resources at a corresponding one of the demand nodes 84. The historical trend data may represent historical demand for one or more resources over any suitable time period, such as, for example, monthly, quarterly, yearly, etc. For example, to continue the supply chain example from above, a first demand node 84a and a second demand node 84b may each require inventory for similar, identical, and/or different categories of goods, e.g., a first demand node 84a may receive a first category of product (e.g., meat) and a second category of product (e.g., dairy) but not a third category of product (e.g., apparel) while a second demand node 84b may receive the first and third categories of products but not the second. Further, the first demand node 84a and the second demand node 84b may utilize one or more shared categories of goods at different rates resulting in different demand requirements, e.g., the first demand node 84a and the second demand node 84b may utilize the first category of product at different rates, resulting in different supply requirements for the first category of goods.

As another example, and with respect to the computing network example above, a first demand node 84a and a second demand node 84b may utilize similar, identical, and/or different computing resources supplied by one or more distribution nodes, e.g., a first demand node 84a may utilize bare metal server resources and cloud storage services while a second demand node 84b may utilize bare metal server resources and virtual server resources. Although specific embodiments and/or examples are discussed herein with respect to certain nodes of the target network 80, it will be appreciated that the disclosed systems and methods may be applied to any suitable nodes of any suitable target network.

In some embodiments, the network data 254 may include one or more distribution channels 86, 88, 90 representative of assignments between a selected one of the distribution nodes 82 and one or more demand nodes 84. Each of the distribution channels 86, 88, 90 may include a fixed (e.g., unchangeable) and/or assignable (e.g., changeable) channel. In some embodiments, the received network data 254 includes a distribution node reassignment, e.g., a distribution channel representative of new assignment between a distribution node and a demand node.

In some embodiments, the target network 80 is representative of a large-scale supply chain distribution network. In such embodiments, the distribution nodes 82 may be representative of distribution locations (e.g., warehouses) configured to provide inventory to demand nodes 84 representative of supply chain demand consumers (e.g., retail stores, local consumers, etc.), the first distribution channels 86 may be representative of a first supply chain distribution channel (e.g., freight shipping via trailers at regular schedules), the second distribution channels 88 may be representative of a second supply chain distribution channel (e.g., on-demand shipping via trailers), and the third distribution channel 90 may be representative of a third supply chain distribution channel (e.g., on-demand shipping via third-party commercial carriers). As another example, in some embodiments, the target network 80 is representative of a large-scale distributed computing environment in which the distribution nodes 82 may be representative of available cloud nodes (e.g., cloud computing servers, processors, memory, storage, etc.), the demand nodes 84 may be representative of consumers of the cloud computing resources (e.g., local computing systems, cloud applications, data services, etc.), the first distribution channels 86 may be representative of a first access channel (e.g., wired network access), the second distribution channel 88 may be representative of a second access channel (e.g., wireless or cellular network access), and the third distribution channel(s) 90 may be representative of a third access channel (e.g., local access). It will be appreciated that these embodiments are exemplary and additional networks may be modeled and/or forecasted by the simulation forecasting computing device 4.

In some embodiments, a target supply chain network may include brick-and-mortar supply chain locations and/or processes (e.g., in-store stocking, sales, tracking, warehousing, distribution locations, receiving locations, etc.) and/or online supply chain processes (e.g., distributed stock tracking, internet-based sales or interactions, delivery processes, third-party merchant processes, online distribution locations, customer delivery locations, etc.). The simulation forecasting computing device 4 may be configured to receive a plurality of inputs, for example, from processing device(s) 10, workstation(s) 12, database 14, one or more user computing devices 16, 18, 20, etc. representative of a historical and/or current state of the supply chain network (e.g., state of each node and/or channel). The simulation forecasting computing device 4 is configured to receive any suitable type of input, such as, for example, a heuristic input, a statistical input, a deep learning generated input, etc. suitable for incorporation into a distribution network demand forecasting process, as discussed herein.

In some embodiments, the demand forecast request 252 may include parameter data 256 defining operational parameters, constraints, costs, etc. for simulation of the target network 80. For example, in some embodiments, the parameter data 256 includes one or more parameters defining a scope of a forecast request for a target network 80. For example, in some embodiments, the parameter data 256 can include a time frame parameter (e.g., a forecast period), a granularity parameter, a fidelity parameter, demand generation parameters (e.g., parameters related to the demand to be forecasted), network inputs (e.g., parameters defining certain structural elements of the target network), constraint parameters (e.g., parameters constraining the simulation or the target network during forecasting), etc. Although specific embodiments are discussed herein, it will be appreciated that any suitable input parameters, such as required or optional parameters, for the simulation can be included in the parameter data 256.

In some embodiments, the parameter data 256 may include and/or can be used to generate a set of inputs to be used by a demand forecast engine 258. For example, in some embodiments, parameter data 256 may include, but is not limited to, input data such as historical data representative of actual demand in or operation of the target network during a prior time period, real-time data representative of current demand in or operation of the target network, and/or estimated inputs generated for one or more time periods, such as past, present, and/or future estimated inputs. In some embodiments, one or more inputs (or parameters) may be generated by one or more input generation models (see, e.g., FIG. 9).

In some embodiments, network data 254 and/or parameter data 256 may be generated by an ingestion process configured to perform real-time, near real-time (e.g., micro batching), and/or batch ingestion of production data related to a target network. In some embodiments, an ingestion process is configured to receive production data, process received production data, and store processed data in one or more storage systems, such as a database 14. The ingestion process may implement any suitable ingestion modules, processes, algorithms, etc., such as, for example, extraction processes, processing modules, type identification processes, flow tracking and visualization processes, volume processes, security processes, sanitization processes, normalization processes, etc. Although specific embodiments are discussed herein, it will be appreciated that any suitable set of ingestion processes can be utilized to process received production data. The ingested data may be generated by any suitable systems, such as, for example, one or more production systems configured to implement and/or monitor at least a portion of an actual implementation of a target network.

In some embodiments, the parameter data 256 includes and/or is utilized to generate one or more inputs. For example, the simulation forecasting computing device 4 may be configured to implement one or more trained models and/or statistical processes to generate heuristic-based inputs, statistical-based inputs, deep learning-based inputs, machine learning-based inputs, and/or other types of inputs. The simulation forecasting computing device 4 may implement multiple, different input generation processes simultaneously, sequentially, and/or intermittently to generate required inputs for a forecast simulation.

At step 204, the feature-based simulation forecasting method 200 determines whether a realignment (if any) of one or more nodes in the target network during a predetermined realignment time period constitutes a significant realignment. The predetermined realignment time period may include any suitable time period, such as, for example, one or more days, weeks, months, quarters, years, etc. prior to the forecast period. As one example, in some embodiments, the predetermined realignment time period is related to periodic forecast generation, e.g., where demand forecasts are generated at predetermined intervals (e.g., once a week, once a month, etc.), the predetermined time period may be the predetermined interval and/or a multiple of the predetermined interval.

As another example, in some embodiments, the predetermined realignment time period may be related to the availability of historic trend data with respect to one or more realigned nodes. For example, the predetermined realignment time period may be equal to a time period necessary to obtain sufficient historical volume data for a distribution node after realignment of one or more demand nodes to allow an accurate demand forecast to be generated for the corresponding distribution node using the collected historical volume data obtained after the realignment. The predetermined realignment time period necessary to obtain sufficient historical volume data may include any suitable time period, such as, for example, one or more days, weeks, months, quarters, years, etc. and/or may be based on analysis of historical volume data or trends for other distribution nodes in the target network.

In some embodiments, a realignment detection engine 262 is configured to determine when realignment of one or more demand nodes in the realignment time period constitutes a significant realignment. A realignment detection engine 262 may be configured to receive a set of target nodes 260, the network data 254, and/or the parameter data 256 and output one of a significant realignment response 264 or an insignificant realignment response 266. The set of target nodes 260 may be provided in any suitable data structure, such as, for example, a list, linked list, a set, an ordered set, a table, a matrix, etc. The realignment detection engine 262 may be configured to implement a realignment detection method and/or one or more modules, models, algorithms, etc. to determine when a realignment (if any) in a target network is a significant realignment.

Figure 9:
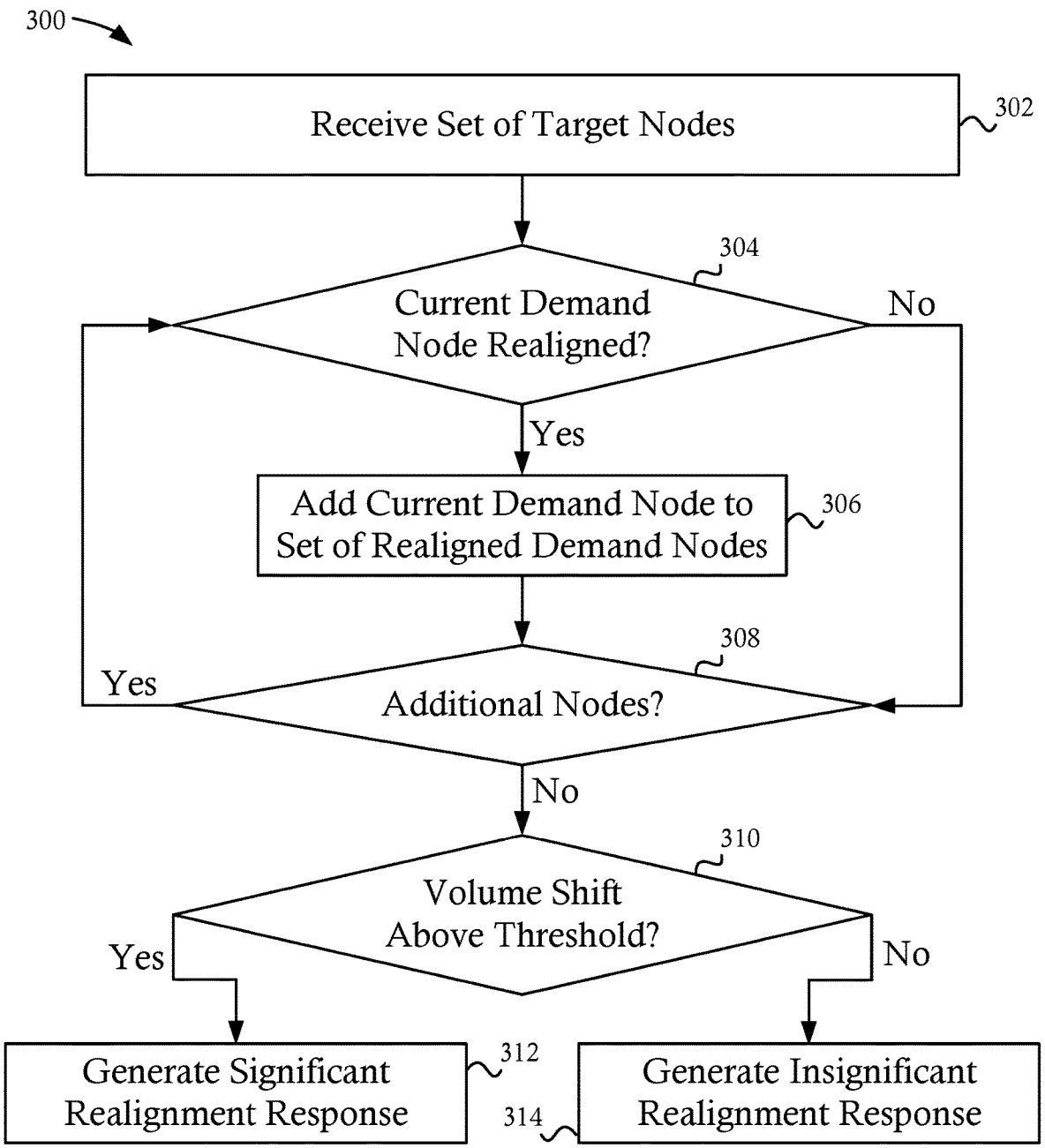
FIG. 9 is a flowchart illustrating a realignment detection method, in accordance with some embodiments.

FIG. 9 is a flowchart illustrating a realignment detection method 300, in accordance with some embodiments. The realignment detection method 300 may be implemented by any suitable device, engine, module, etc., such as a realignment detection engine 262, to determine when a realignment (if any) of one or more demand nodes in a set of target nodes 260 constitutes a significant realignment. In some embodiments, a significant realignment is determined based on a weighted volume change in the set of target nodes 260 and/or the target network.

At step 302, the set of target nodes 260 is received. The set of target nodes 260 may include one or more demand nodes and/or distribution nodes in a target network, such as all of the demand nodes and/or all of the distribution nodes in a target network and/or a subset of the demand nodes and/or distribution nodes in the target network. As one example, in some embodiments, the set of target nodes 260 may include all demand nodes associated with one or more distribution nodes of a target network identified and/or selected for demand forecasting in the forecast period. As another example, in some embodiments, the set of target nodes 260 may include demand nodes associated with a selected distribution node at a selected time, e.g., the start of a forecast period, the current date, etc. The set of target nodes 260 may be defined by a portion of the network data 254 and/or the parameter data 256, may be selected based on one or more selection parameters (e.g., all demand nodes associated with selected distribution nodes), and/or received from a separate input source.

In some embodiments, a realigned node data structure is instantiated in response to execution of the realignment detection method 300 and/or to receiving the set of target nodes 260. The realigned node data structure may include any suitable data structure, such as, for example, a list, linked list, a set, an ordered set, etc. and may be instantiated as an empty set. As discussed in greater detail below, the realigned node data structure is configured to be populated with data related to one or more nodes that are identified as having been realigned within a predetermined time period.

At step 304, the realignment detection method 300 determines when a current demand node in the set of target nodes 260 was realigned within a predetermined realignment time period. During an initial iteration of step 304, the current demand node is a first demand node in the set of target nodes 260. During a subsequent iteration of step 304, the current demand node is a subsequent demand node in the set of target nodes 260. The realignment determination may be based on network data 254 and/or parameter data 256 associated with the current demand node in the set of target nodes 260.

In some embodiments, the network data 254 and/or the parameter data 256 may include data identifying realigned demand nodes and/or distribution nodes in the target network 80. For example, the network data 254 and/or the parameter data may include an express realignment indicator (e.g., realignment flag), a change in associated data from a prior period (e.g. change in distribution node and demand node association, change of distribution channel association, etc.) indicating that a demand node has been realigned within the predetermined realignment time period, alignment periods for specific distribution nodes, etc. Although specific embodiments are discussed herein, it will be appreciated that any suitable data may be used to identify realigned demand nodes in the set of target nodes 260. If, at step 304, the realignment detection method 300 determines that the current node was realigned within the predetermined realignment time period, the realignment detection method 300 proceeds to step 306. If, at step 304, the realignment detection method 300 determines that the current node was not realigned, the realignment detection method 300 proceeds to step 308.

At step 306, the current node is added to a set of realigned nodes. The current node may be added to the set of realigned nodes using any suitable method and/or process, such as, for example, appending the realigned node (e.g., data associated with and/or identifying the realigned node) to a data structure, such as the realigned node data structure, representative of the set of realigned nodes. In some embodiments, the current node is added to the set of realigned nodes in conjunction with additional data associated with the corresponding node, such as, for example, alignment time periods, historic volume data, etc.

For example, in some embodiments, a node may be added to the set of realigned nodes in conjunction with a realignment count variable corresponding to the number of realignments that have occurred for the corresponding demand node over a selected historical time period. The selected historical time period may include any suitable time period, such as, for example, one or more days, months, quarters, years, etc., prior to the current period and/or forecasted period. In some embodiments, the current node and a corresponding realignment count variable may be stored as a set within the realigned node data structure, although it will be appreciated that any suitable storage mechanism and/or structure may be used. In some embodiments, the realignment count variable is generated by obtaining a current realignment count associated with the current node and incrementing the value by one. For example, when a demand node is generated (e.g., created, instantiated, etc.) a current realignment count variable can be instantiated having a zero value and subsequently incremented for each realignment of the corresponding demand node.

At step 308, the realignment detection method 300 determines when one or more additional nodes in the set of target nodes 260 remains to be evaluated for realignment. For example, in some embodiments, a counter is incremented after each node in the set of demand nodes is evaluated at step 304. The realignment detection method 300 may compare the current count of the counter to a length of the set of target nodes 260 and determine additional nodes remain to be evaluated when the counter is less than the length and that all nodes have been evaluated when the counter is equal to the length. Although specific embodiments are discussed herein, it will be appreciated that any suitable mechanism may be used to determine if one or more additional nodes remain to be evaluated. If at least one additional node remains, the realignment detection method 300 obtains a subsequent node in the set of target nodes 260 and returns to step 304 for evaluation of the subsequent node. If no additional nodes remain, the realignment detection method 300 proceeds to step 310.

At step 310, the realignment detection method 300 determines when the set of realigned nodes represents a significant realignment and/or volume shift. For example, in some embodiments, a total realignment weight is generated for the set of realigned nodes. When the total realignment weight is equal to and/or greater than a predetermined threshold, the set of realigned nodes may be considered to be a significant realignment and, conversely, when the total realignment weight is equal to and/or less than a predetermined threshold, the set of realigned nodes may not be considered a significant realignment.

In some embodiments, the total realignment weight may be generated by aggregating individual realignment weights for each realigned node in the set of realigned nodes. For example, the total realignment weight, $W_T$, may be determined as:

$$W_T = \sum_{i=1}^{I} N_i W_i$$

where I is a total number of nodes in the set of realigned nodes, $N_i$ is the realignment count variable for a corresponding realigned node i, and $W_i$ is a weight for a corresponding realigned node i. In some embodiments, a realigned node weight $W_i$ may be determined as a mean volume of a corresponding demand node over a predetermined demand time period divided by a mean volume of all demand nodes over the predetermined demand time period. The predetermined demand time period may include any suitable time period, such as, for example, one or more weeks, months, years, etc.

In some embodiments, if the total realignment weight is equal to and/or greater than a predetermined threshold, the realignment detection method 300 proceeds to step 312 and the significant realignment response 264 is generated indicating that the realigned nodes constitute a significant change with respect to demand forecasting. Conversely, if the total realignment weight is equal to and/or less than a predetermined threshold, the realignment detection method 300 proceeds to step 314 and the insignificant realignment response 266 is generated indicating that the realigned nodes (if any) in the target network for the predetermined realignment time period do not constitute a significant change with respect to demand forecasting. In some embodiments, step 310 includes an initial check to determine when the set of realigned nodes is an empty set and proceeds directly to step 314 when the set of realigned nodes is an empty set.

With reference again to FIGS. 6-7, when the feature-based simulation forecasting method 200 determines at step 204 that the realignment of the set of target nodes 260 constitutes a significant realignment (e.g., when the realignment detection method 300 generates a significant realignment response 264), the feature-based simulation forecasting method 200 proceeds to step 206. Alternatively, when the feature-based simulation forecasting method 200 determines at step 204 that the realignment of the set of target nodes 260 does not constitute a significant realignment (e.g., when the realignment detection method 300 generates an insignificant realignment response 266), the feature-based simulation forecasting method 200 proceeds to step 210.

When the realignment of the set of target nodes 260 constitutes a significant realignment, an estimated volume feature 270 is generated for a first set of target distribution nodes in the target network at step 206. The set of target distribution nodes may include any subset of distribution nodes in a target network, such as, for example, each distribution node in a target network, each distribution node for which a demand node was realigned (e.g., added, removed), each distribution node that had a significant realignment of demand nodes (for example, as determined according to the process described in conjunction with step 204), each distribution node in the set of target nodes 260, etc. In some embodiments, the estimated volume feature 270 is based on historical demand period volume data for each demand node in a set of distribution node-specific demand nodes associated with a selected distribution node in the set of target distribution nodes. The set of distribution node-specific demand nodes may include each demand node assigned to a selected distribution node during a forecast period.

In some embodiments, the estimated volume feature 270 is generated based on corresponding alignment periods for each demand node in the set of distribution node-specific demand nodes and a projected demand volume for each demand node in the set of distribution node-specific demand nodes. For example, an estimated feature generation module 268 may be configured to generate a realignment table including each demand node in a set of demand nodes (e.g., the set of distribution node-specific demand nodes, a set of all realigned demand nodes, a set of all demand nodes in the target network, etc.), associated distribution node assignments for each demand node in the set of demand nodes, and alignment periods during which a demand node was aligned with a corresponding distribution node. A non-limiting example of a realignment table for a set of eight demand nodes (e.g., S1-S8) and three distribution nodes (e.g., DC1, DC2, DC3) may include:

| Demand Node | Distribution Node | Period Start | Period End |
|---|---|---|---|
| S1 | DC1 | Jan. 1, 1970 | — |
| S2 | DC1 | Jun. 1, 1990 | — |
| S3 | DC1 | Jan. 1, 1970 | Feb. 1, 2021 |
| S3 | DC2 | Feb. 2, 2021 | — |
| S4 | DC1 | Jan. 1, 1970 | — |
| S5 | DC1 | Jan. 1, 1970 | — |
| S6 | DC2 | Jan. 1, 1970 | Nov. 14, 2020 |
| S6 | DC3 | Nov. 15, 2020 | — |
| S7 | DC2 | Jan. 1, 1970 | — |
| S8 | DC2 | Jan. 1, 1970 | — |

As shown above, a third demand node (e.g., S3) is aligned with the first distribution node (e.g., DC1) for an alignment period from 1 Jan. 1970 to 1 Feb. 2021 and is realigned to the second distribution node (e.g., DC2) from 2 Feb. 2021 to the current date (represented as a dash mark or empty set in the table). Similarly, a sixth demand node S6 is aligned with the second distribution node DC2 from 1 Jan. 1970 through 15 Nov. 2020 and is aligned with a third distribution node DC3 from 15 Nov. 2020 to the current date. Although specific examples of realignments are provided herein, it will be appreciated that a realignment table may include an suitable set of realignments over any suitable period, such as, for example, multiple realignments for a single demand node and/or realignment of multiple demand nodes in the same and/or different alignment periods for any period since instantiation (e.g., opening, implementation, etc.) of one or more of the demand nodes, any period since instantiation (e.g., opening, implementation, etc.) of one or more distribution nodes, a period beginning at a specified start date, etc.

In some embodiments, a projected demand volume for the forecast period for each demand node in a set of distribution node-specific demand nodes is generated based on the alignment periods in the realignment table (or other realignment data structure). The set of distribution node-specific demand nodes includes the set of demand nodes assigned to a selected distribution node during a specific forecast period. As one non-limiting example, for the realignment table included above, a set of distribution node-specific demand nodes for the first distribution node DC1 would include each of the first demand node S1, the second demand node S2, the third demand node S3, the fourth demand node S4, and the fifth demand node S5 for a forecast period prior to 2 Feb. 2021 (e.g., a forecast period of the first week of 2021) and would include each of the first demand node S1, the second demand node S2, the fourth demand node S4, and the fifth demand node S5 for a forecast period after 2 Feb. 2021 (e.g., a forecast period of the ninth week of 2021), as the third demand node S3 was realigned to the second distribution node DC2 as of 2 Feb. 2021.

Historical demand period volume data is obtained for each demand node in the set of distribution node-specific demand nodes for historical demand periods corresponding to the forecast period. The historical demand period volume data may include historical demand data for corresponding demand periods (e.g., days, weeks, months, etc.) in prior tracking periods (e.g., months, quarters, years, etc.). For example, where a forecast period is defined as specific or segmented weeks of the year (e.g., second week, eight week, fortieth week, etc.), the corresponding demand periods include corresponding weeks of prior years (e.g., the prior tracking period is years). Although specific embodiments are discussed herein, it will be appreciated that any suitable demand periods and/or tracking periods may be defined and may or may not correspond to calendars, quarters, and/or other defined time periods.

The historical demand period volume data includes the historical demand for a demand node during the corresponding demand period in the prior tracking period, e.g., where the current forecast period is the second week of 2024, historical demand period volume data is obtained for each demand node in the set of distribution node-specific demand nodes for the second week of 2023, the second week of 2022, the second week of 2021, etc.). Historical demand period volume data may be obtained for all prior tracking periods and/or may be obtained for a subset of prior tracking periods (e.g., only the most recent N prior tracking periods, where N is a natural number). In embodiments where historical data is unavailable for a prior tracking period, projected and/or simulated volume data may be generated and/or obtained for that tracking period and/or the tracking period may be omitted.

In some embodiments, a projected demand volume is generated for each demand node in the set of distribution node-specific demand nodes during the forecast period based on the historical demand period volume data. For example, in some embodiments, the projected demand volume is a median of the historical demand period volume data for each demand node. As another example, in some embodiments, the projected demand volume is a weighted mean of the historical demand period volume data for each demand node. Although specific embodiments are discussed herein, it will be appreciated that the projected demand volume may be derived using any suitable method or process, such as, for example, obtaining a mean or weighted mean of the historical demand period volume data, obtaining a median historical demand period volume data, obtaining a maximum, minimum, etc. of the historical demand period volume data, etc.

In some embodiments, the estimated volume feature 270 is generated for each distribution node in the set of target distribution nodes by aggregating the projected demand volume of each demand node in the set of distribution-node specific demand nodes associated with the corresponding distribution node. For example, the estimated volume feature 270 may be generated by summing the projected demand volume for each demand node in a set of distribution-node specific demand nodes. The summation may include an unweighted and/or weighted sum. Although specific embodiments are discussed herein, it will be appreciated that the projected demand volumes for each demand node may be aggregated using any suitable combination and/or algorithm.

At step 208, an updated node weight $W_i$ 272 is calculated for each demand node in the set of distribution-node specific demand nodes. For example, as discussed above, in some embodiments, a node weight $W_i$ may be a mean volume of the demand node over a predetermined demand time period divided by a mean volume of all demand nodes over the predetermined demand time period. An updated node weight $W_i$ 272 may be determined as the projected volume for a demand node in the set of distribution-node specific demand nodes over the forecast period divided by a mean estimated/actual volume of all demand nodes in the set of distribution-node specific demand nodes over the predetermined demand time period. As another example, in some embodiments, an updated node weight $W_i$ 272 may be determined as the projected volume for a demand node in the set of distribution-node specific demand nodes over the forecast period divided by a mean estimated/actual volume of all demand nodes in the target network over the predetermined demand time period. The updated node weight $W_i$ 272 may be stored in conjunction with other node data, such as node assignment data in, for example, a database 14. The feature-based simulation forecasting method 200 proceeds to step 212 after step 208.

At step 210, an actual volume feature 276 is generated for a second set of target distribution nodes in the target network. The second set of target distribution nodes may include any subset of distribution nodes in a target network, such as, for example, each distribution node in a target network, each distribution node for which a demand node was not realigned, each distribution node that did not have a significant realignment of demand nodes (for example, as determined according to the process described in conjunction with step 204), etc.

In some embodiments, the actual volume feature 276 is generated by an actual feature generation module 274 based on historical demand period volume data for a selected distribution node. The historical demand period volume data may include historical volume data for corresponding demand periods (e.g., days, weeks, months, etc.) in prior tracking periods (e.g., months, quarters, years, etc.) for the selected distribution node. For example, where a forecast period is defined as specific or segmented weeks of the year (e.g., second week, eight week, fortieth week, etc.), the corresponding demand periods include corresponding weeks of prior years (e.g., the prior tracking period is years). Although specific embodiments are discussed herein, it will be appreciated that any suitable demand periods and/or tracking periods may be defined and may or may not correspond to calendars, quarters, and/or other defined time periods.

The historical demand period volume data includes the historical volume for the selected distribution node during the corresponding demand period in the prior tracking period, e.g., where the current forecast period is the second week of 2024, historical demand period volume data is obtained for the distribution node for the second week of 2023, the second week of 2022, the second week of 2021, etc.). Historical demand period volume data may be obtained for all prior tracking periods and/or may be obtained for a subset of prior tracking periods (e.g., only the most recent N prior tracking periods, where N is a natural number). In embodiments where historical data is unavailable for a prior tracking period, projected and/or simulated volume data may be generated and/or obtained for that tracking period and/or the tracking period may be omitted.

In some embodiments, an actual volume feature 276 is generated for the selected distribution node during the forecast period based on the historical demand period volume data. For example, in some embodiments, the actual volume feature 276 is a median of the historical demand period volume data for the distribution node. As another example, in some embodiments, the actual volume feature 276 is a weighted mean of the historical demand period volume data for the distribution node. Although specific embodiments are discussed herein, it will be appreciated that the actual volume feature 276 may be derived using any suitable method or process, such as, for example, obtaining a mean or weighted mean of the historical demand period volume data, obtaining a median historical demand period volume data, obtaining a maximum, minimum, etc. of the historical demand period volume data, etc.

At step 212, a demand forecast 280 is generated. The demand forecast may be generated by any suitable system, device, model, module, engine, etc., such as, for example, a demand forecasting engine 278. In some embodiments, the demand forecast 280 is generated based, at least in part, on one of an estimated volume feature 270 or an actual volume feature 276. For example, the demand forecasting engine 278 may be configured to receive a demand volume feature input and generate a demand forecast output. The format of the estimated volume feature 270 and the actual volume feature 276 may be the same and/or similar such that the demand forecasting engine 278 can utilize either to generate a demand forecast output. As another example, in some embodiments, the demand forecasting engine 278 may be configured to determine if a received demand volume feature input is an estimated volume feature 270 or an actual volume feature 276 and implement a selected demand forecast process and/or model based on the type of demand volume feature received. The generated demand forecast 280, e.g., the generate demand forecast data structure, may be provided to one or more additional processes, such as, for example, additional network simulation processes, implementation processes, demand fulfillment processes, review processes, etc.

In some embodiments, the demand forecast 280 is generated by a demand forecast model 282 implemented by and/or integrated into the demand forecasting engine 278. The demand forecast model 282 may include any suitable machine learning model configured to receive one of an estimated volume feature 270 or an actual volume feature 276 and output a demand forecast 280, such as a demand forecast data structure. The demand forecast model 282 may be generated by an iterative training process, for example as discussed below with respect to FIGS. 10-11, utilizing a training dataset including estimated volume features 270 and/or actual volume features 276 and associated actual demand for the corresponding forecast periods.

At step 214, actual demand volume data 284 representative of an actual demand for one or more demand nodes and/or one or more distribution nodes is received for an elapsed forecast period. For example, after the forecast period has passed (e.g. elapsed), actual demand volume data 284 for the corresponding period may be obtained for each demand node and/or each distribution node and stored. The actual demand volume data 284 for the forecast period may be used in subsequent demand forecasts for corresponding forecast periods, e.g., similar weeks in subsequent years, and/or may be used to refine one or more models, such as the demand forecast model 282. In some embodiments, the training dataset used to generate the demand forecast model 282 is updated to include the demand forecast 280 for the forecast period, the actual demand volume data 284 for the forecast period, and the one of an estimated volume feature 270 or an actual volume feature 276 used to generate the demand forecast 280 for the forecast period.

It will be appreciated that determinations regarding significant realignments within target networks and/or demand forecasting as disclosed herein, particularly on large datasets intended to be used to generate demand forecasts for large scale distribution networks, is only possible with the aid of computer-assisted machine-learning algorithms and techniques, such as the disclosed feature-based simulation forecasting method 200 and/or the disclosed realignment detection method 300. In some embodiments, computer-implemented processes including the disclosed feature-based simulation forecasting method 200 and/or the disclosed realignment detection method 300, and/or machine learning models, such as the trained demand forecast model 282, are used to perform operations that cannot practically be performed by a human, either mentally or with assistance, such as identification of significant realignments within a large scale distribution network within a time frame suitable for use in demand forecasting for upcoming demand periods. It will be appreciated that a variety of machine learning techniques can be used alone or in combination to generate a trained demand forecast model 282 and/or to perform one or more of the feature-based simulation forecasting method 200 and/or the disclosed realignment detection method 300.

Figure 10:
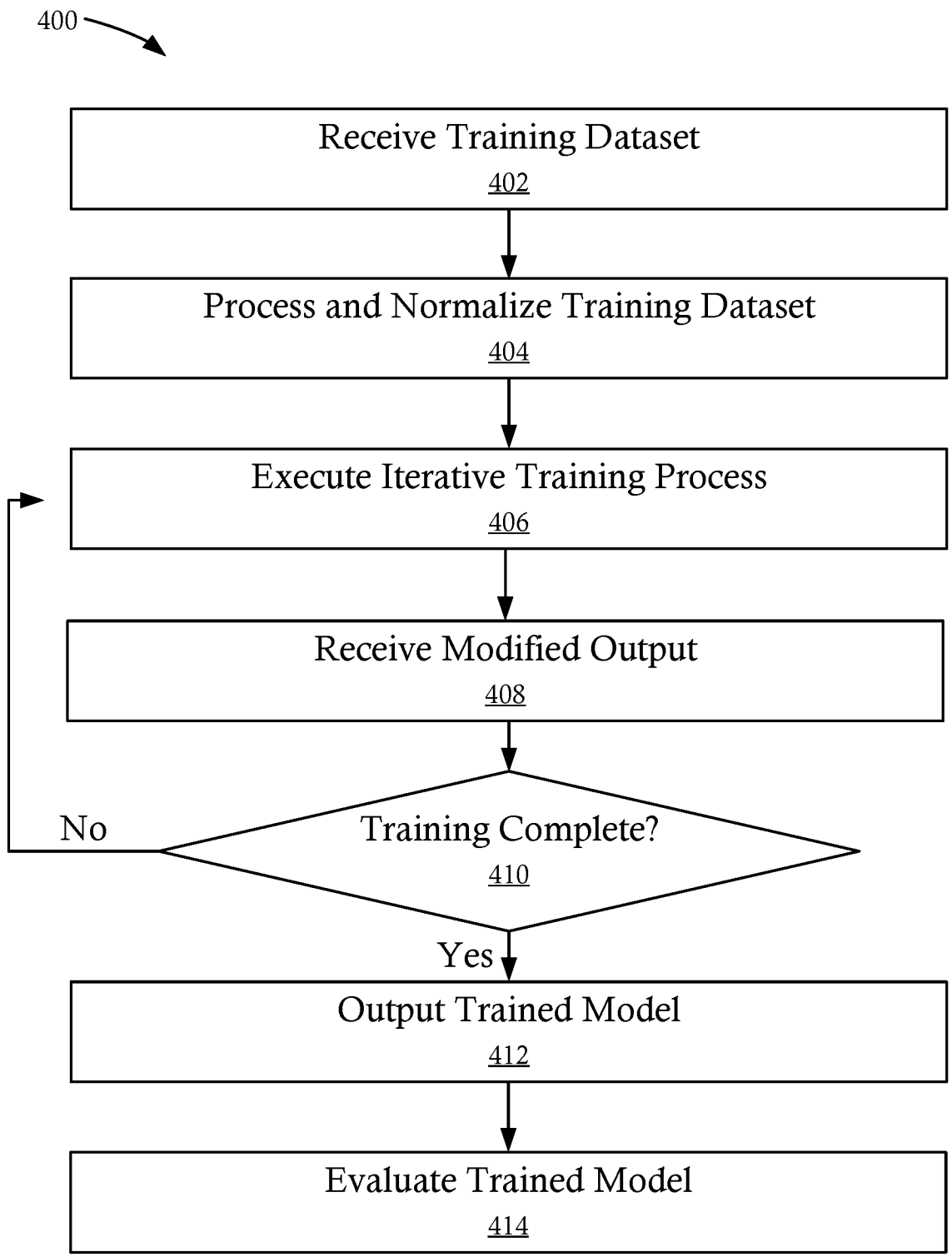
FIG. 10 is a flowchart illustrating a training method for generating a trained machine learning model, in accordance with some embodiments.
Figure 11:
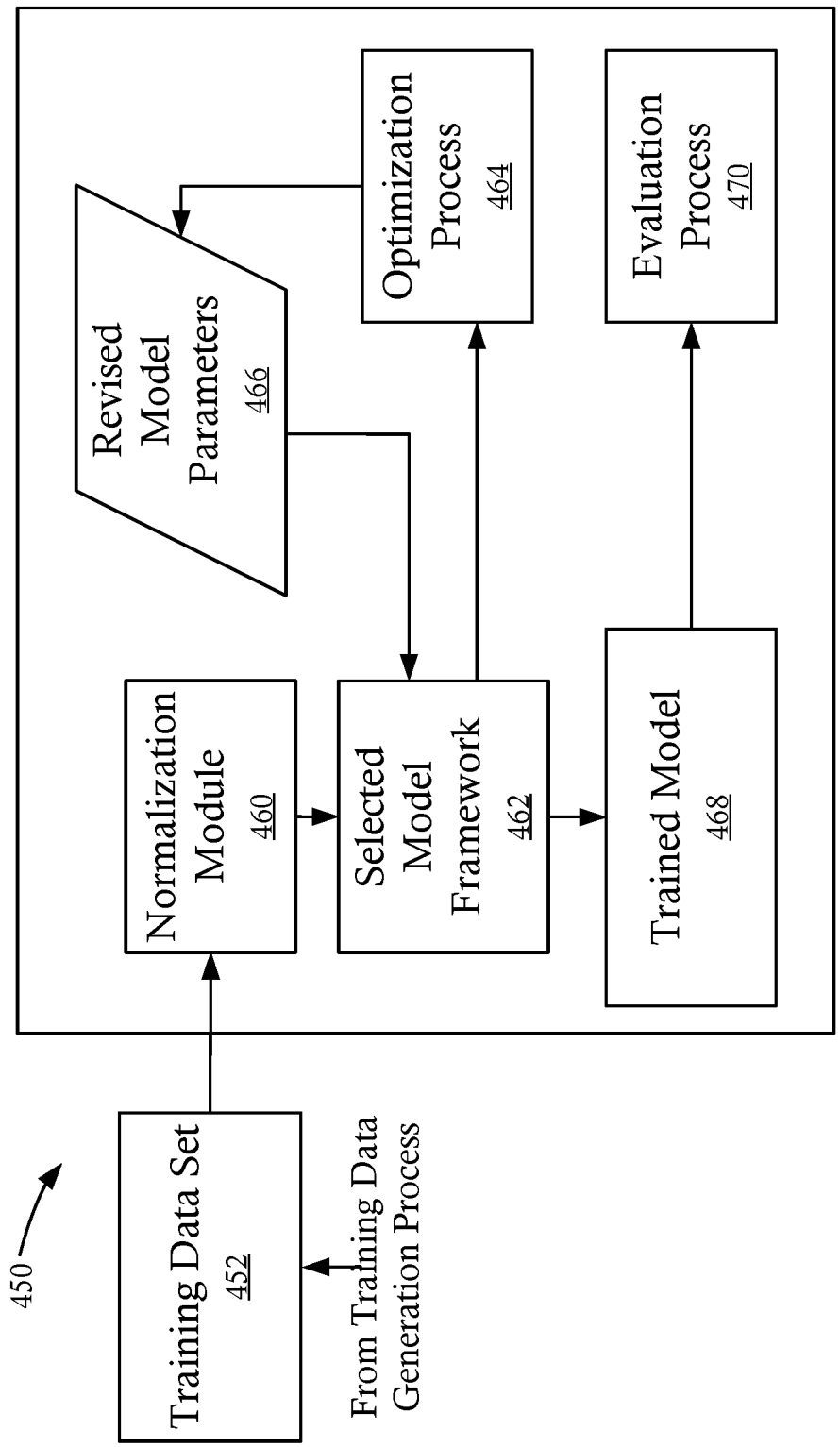
FIG. 11 is a process flow illustrating various steps of the training method of FIG. 10, in accordance with some embodiments.

In some embodiments, the feature-based simulation forecasting method 200 can include and/or implement one or more trained models, such as a trained demand forecast model 282. In some embodiments, one or more trained models can be generated using an iterative training process based on a training dataset. FIG. 10 illustrates a method 400 for generating a trained model, such as a trained demand forecast model, in accordance with some embodiments. FIG. 11 is a process flow 450 illustrating various steps of the method 400 of generating a trained model, in accordance with some embodiments. At step 402, a training dataset 452 is received by a system, such as a processing device 10. The training dataset 452 can include labeled and/or unlabeled data. For example, in some embodiments, a set of labeled data including actual demand volume for the corresponding defined forecast periods and one of an estimated volume feature 270 or an actual volume feature 276 for each defined forecast period is provided for use in training a model.

At optional step 404, the received training dataset 452 is processed and/or normalized by a normalization module 460. For example, in some embodiments, the training dataset 452 can be augmented by imputing or estimating missing values of one or more features associated with a trained demand forecast model 282. In some embodiments, processing of the received training dataset 452 includes outlier detection configured to remove data likely to skew training of a demand forecast model 282. In some embodiments, processing of the received training dataset 452 includes removing features that have limited value with respect to training of the demand forecast model 282.

At step 406, an iterative training process is executed to train a selected model framework 462. The selected model framework 462 can include an untrained (e.g., base) machine learning model and/or a partially or previously trained model (e.g., a prior version of a trained model). The training process is configured to iteratively adjust parameters (e.g., hyperparameters) of the selected model framework 462 to minimize a cost value (e.g., an output of a cost function) for the selected model framework 462. In some embodiments, the cost value is related to forecasting accuracy of the demand forecast model 282 as determined by a difference between a forecasted demand for a forecast period (e.g., a forecast demand generated by the selected model framework 462 based on one of an estimated volume feature 270 or an actual volume feature 276 for the forecast period) and an actual demand for the forecast period.

The training process is an iterative process that generates set of revised model parameters 466 during each iteration. The set of revised model parameters 466 can be generated by applying an optimization process 464 to the cost function of the selected model framework 462. The optimization process 464 can be configured to reduce the cost value (e.g., reduce the output of the cost function) at each step by adjusting one or more parameters during each iteration of the training process.

After each iteration of the training process, at step 408, a determination is made whether the training process is complete. The determination at step 408 can be based on any suitable parameters. For example, in some embodiments, a training process can complete after a predetermined number of iterations. As another example, in some embodiments, a training process can complete when it is determined that the cost function of the selected model framework 462 has reached a minimum, such as a local minimum and/or a global minimum.

At step 410, a trained model 468, such as a trained demand forecast model 282, is output and provided for use in a simulation forecasting method, such as the feature-based simulation forecasting method 200 discussed above with respect to FIGS. 6-7. At optional step 412, a trained model 468 can be evaluated by an evaluation process 470. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a non-transitory memory; and
   a processor communicatively coupled to the non-transitory memory, wherein the processor is configured to read a set of instructions to:
   receive a set of target nodes comprising at least one demand node realignment representative of a demand volume shift for at least one corresponding distribution node in a predetermined time period;
   determine when the demand volume shift is equal to or above a predetermined volume shift threshold by:
   identifying one or more realigned nodes in the set of target nodes; and
   comparing a total realignment weight of the realigned nodes to the predetermined volume shift threshold;
   when the demand volume shift is equal to or above the predetermined volume shift threshold, generate an estimated volume feature for the at least one corresponding distribution node by summing a projected demand volume for each demand node in a set of distribution-node specific demand nodes;

when the demand volume shift is below the predetermined volume shift threshold, generate an actual volume feature for the at least one corresponding distribution node based on historical demand period volume data for the at least one corresponding distribution node;

train a forecasting model to generate demand forecast data structures using training datasets that include at least one of aggregation data, variant-level data, holiday and event data, recall data, historical user session data, search data, purchase data, catalog data, and advertisement data;

generate, by the trained forecasting model, a demand forecast data structure based on the generated one of the estimated volume feature or the actual volume feature; and retrain the trained forecasting model using the estimated volume feature or the actual volume feature and an associated actual demand for the predetermined time period.

2. The system of claim 1, wherein determining when the demand volume shift is equal to or above the predetermined volume shift threshold comprises:

determining an individual realignment weight for each realigned node in the set of target nodes; and aggregating the individual realignment weight for each realigned node to generate the total realignment weight for the set of target nodes.

3. The system of claim 2, wherein the individual realignment weight for each realigned node is determined based on a mean volume of each realigned node over a predetermined demand time period and a mean volume of all demand nodes over the predetermined demand time period.

4. The system of claim 2, wherein the individual realignment weight for each realignment node is based on a number of prior realignments of each realignment node.

5. The system of claim 1, wherein determining when the demand volume shift is equal to or above the predetermined volume shift threshold comprises:

generating a significant realignment response when the demand volume shift is equal to or above the predetermined volume shift threshold; and generating an insignificant realignment response when the demand volume shift is below the predetermined volume shift threshold.

6. The system of claim 1, wherein the estimated volume feature is generated based on historic demand volume for each demand node in the set of target demand nodes assigned to the at least one corresponding distribution node in a forecast period.

7. The system of claim 6, wherein the historic demand volume is obtained for historic demand periods corresponding to the forecast period in prior tracked periods.

8. The system of claim 1, wherein the set of target nodes are representative of a large scale distribution network.

9. The system of claim 1, wherein the actual volume feature is generated based on historic volume for the at least one corresponding distribution node.

10. The system of claim 1, wherein the processor is configured to read the set of instructions to train the forecasting model utilizing an iterative training process based, at least in part, on the generated one of the estimated volume feature or the actual volume feature.

11. A computer-implemented method, comprising:

receiving, by a processor, a set of target nodes comprising at least one demand node realignment representative of a demand volume shift for at least one corresponding distribution node in a predetermined time period; and Determining, by the processor, when the demand volume shift is equal to or above a predetermined volume shift threshold by:

identifying one or more realigned nodes in the set of target nodes; and comparing a total realignment weight to the predetermined volume shift threshold;

when the demand volume shift is equal to or above the predetermined volume shift threshold, generating, by the processor, an estimated volume feature for the at least one corresponding distribution node by summing a projected demand volume for each demand node in a set of distribution-node specific demand nodes;

when the demand volume shift is below the predetermined volume shift threshold, generating, by the processor, an actual volume feature for the at least one corresponding distribution node based on historical demand period volume data for the at least one corresponding distribution node;

training a forecasting model to generate demand forecast data structures using training datasets that include at least one of aggregation data, variant-level data, holiday and event data, recall data, historical user session data, search data, purchase data, catalog data, and advertisement data;

providing, by the processor, the generated one of the estimated volume feature or the actual volume feature to the trained forecasting model;

generating, by the trained forecasting model, a demand forecast data structure based on the generated one of the estimated volume feature or the actual volume feature; and retraining the trained forecasting model using the estimated volume feature or the actual volume feature and an associated actual demand for the predetermined time period.

12. The computer-implemented method of claim 11, wherein determining when the demand volume shift is equal to or above the predetermined volume shift threshold comprises:

determining an individual realignment weight for each realigned node in the set of target nodes;

aggregating the individual realignment weight for each realigned node to generate the total realignment weight for the set of target nodes.

13. The computer-implemented method of claim 12, wherein the individual realignment weight for each realigned node is determined based on a mean volume of each realigned node over a predetermined demand time period and a mean volume of all demand nodes over the predetermined demand time period.

14. The computer-implemented method of claim 12, wherein the individual realignment weight for each realignment node is based on a number of prior realignments of each realignment node.

15. The computer-implemented method of claim 11, wherein determining when the demand volume shift is equal to or above the predetermined volume shift threshold comprises:

generating a significant realignment response when the demand volume shift is equal to or above the predetermined volume shift threshold; and generating an insignificant realignment response when the demand volume shift is below the predetermined volume shift threshold.

16. The computer-implemented method of claim 11, wherein the estimated volume feature is generated based on historic demand volume for each demand node in the set of target demand nodes assigned to the at least one corresponding distribution node in a forecast period.

17. The computer-implemented method of claim 16, wherein the historic demand volume is obtained for historic demand periods corresponding to the forecast period in prior tracked periods.

18. The computer-implemented method of claim 11, wherein the actual volume feature is generated based on historic volume for the at least one corresponding distribution node.

19. A non-transitory computer-readable medium having instructions stored thereon, wherein the instructions, when executed by at least one processor, cause at least one device to perform operations comprising:

receiving a set of target nodes comprising at least one demand node realignment representative of a demand volume shift for at least one corresponding distribution node in a predetermined time period;

determining when the demand volume shift is equal to or above a predetermined volume shift threshold;

when the demand volume shift is equal to or above the predetermined volume shift threshold, generating an estimated volume feature for the at least one corresponding distribution node, wherein the estimated volume feature is generated based on historic demand volume for each demand node in the set of target demand nodes assigned to the at least one corresponding distribution node in a forecast period by summing a projected demand volume for each demand node in a set of distribution-node specific demand nodes;

when the demand volume shift is below the predetermined volume shift threshold, generating an actual volume feature for the at least one corresponding distribution node, wherein the actual volume feature is generated based on historic volume for the at least one corresponding distribution node based on historical demand period volume data for the at least one corresponding distribution node;

train a forecasting model to generate demand forecast data structures using training datasets that include at least one of aggregation data, variant-level data, holiday and event data, recall data, historical user session data, search data, purchase data, catalog data, and advertisement data;

providing the generated one of the estimated volume feature or the actual volume feature to the trained forecasting model;

generating by the trained forecasting model, a demand forecast data structure based on the generated one of the estimated volume feature or the actual volume feature; and retraining the trained forecasting model using the estimated volume feature or the actual volume feature and an associated actual demand for the predetermined time period.

20. The non-transitory computer-readable medium of claim 19, wherein determining when the demand volume shift is equal to or above the predetermined volume shift threshold comprises:

identifying one or more realigned nodes in the set of target nodes;

determining an individual realignment weight for each realigned node in the set of target nodes;

aggregating the individual realignment weight for each realigned node to generate a total realignment weight for the set of target nodes; and comparing the total realignment weight to the predetermined volume shift threshold.

* * * * *